(12) United States Patent
Sato et al.

(10) Patent No.: US 10,061,505 B2
(45) Date of Patent: Aug. 28, 2018

(54) ELECTRONIC DEVICE AND OPERATION INPUT METHOD

(71) Applicant: Alpine Electronics, Inc., Tokyo (JP)

(72) Inventors: Takao Sato, Iwaki (JP); Shizuo Kanbayashi, Iwaki (JP); Fumiaki Hoki, Iwaki (JP); Rintaro Kuroda, Iwaki (JP); Takashi Jogataki, Iwaki (JP); Naoki Saegusa, Iwaki (JP); Haruhiko Nakatsuji, Iwaki (JP); Hai Lin, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 88 days.

(21) Appl. No.: 14/171,016

(22) Filed: Feb. 3, 2014

(65) Prior Publication Data

US 2014/0347288 A1 Nov. 27, 2014

(30) Foreign Application Priority Data

May 23, 2013 (JP) .................................. 2013-108485

(51) Int. Cl.
*G06F 3/0488* (2013.01)
*G06F 3/0489* (2013.01)
*G06F 3/0482* (2013.01)

(52) U.S. Cl.
CPC .......... *G06F 3/0488* (2013.01); *G06F 3/0482* (2013.01); *G06F 3/04895* (2013.01)

(58) Field of Classification Search
CPC ............................... G06F 3/017; G06F 3/0488
USPC ......... 345/173–179; 178/18.01–18.11, 19.01
See application file for complete search history.

(56) References Cited

U.S. PATENT DOCUMENTS

| 7,761,801 B2 * | 7/2010 | Park ....................... G06F 3/0481 |
| | | 715/706 |
| 8,875,046 B2 * | 10/2014 | Jitkoff ............................ 715/786 |
| 2010/0058252 A1 * | 3/2010 | Ko ....................... G06F 3/04883 |
| | | 715/863 |
| 2010/0124949 A1 * | 5/2010 | Demuynck et al. ........ 455/569.1 |
| 2010/0214238 A1 | 8/2010 | Christoph et al. |

(Continued)

FOREIGN PATENT DOCUMENTS

JP 2009-42796 2/2009
JP 2010277319 12/2010

(Continued)

OTHER PUBLICATIONS

Office Action for JP2013-108485 dated dispatched Dec. 27, 2016, 9 pgs. Including English abstract.

*Primary Examiner* — Nelson Rosario
*Assistant Examiner* — Scott Au
(74) *Attorney, Agent, or Firm* — Brinks Gilson & Lione

(57) ABSTRACT

An in-vehicle device includes an operation screen display unit that displays a specific operation screen containing an operation key for causing the in-vehicle device to perform a specific action, an operation key moving unit that moves the operation key in a predetermined direction, a camera and a movement recognition unit that detect a movement of part of a body of a user or a movement of an operation member held by the user, and an operation selection unit that, when a movement direction of the operation key matches a direction of the detected movement of the user, selects the operation key moved by the operation key moving unit.

18 Claims, 4 Drawing Sheets

(56) References Cited

U.S. PATENT DOCUMENTS

| | | | |
|---|---|---|---|
| 2010/0275159 A1* | 10/2010 | Matsubara | G06F 3/011 715/810 |
| 2011/0063425 A1* | 3/2011 | Tieman | 348/61 |
| 2011/0098109 A1* | 4/2011 | Leake | A63F 13/428 3/428 |
| 2011/0138322 A1 | 6/2011 | Aoki | |
| 2011/0267291 A1* | 11/2011 | Choi et al. | 345/173 |
| 2012/0056833 A1* | 3/2012 | Narita | G06F 3/0488 345/173 |
| 2012/0287262 A1 | 11/2012 | Nakayama et al. | |
| 2015/0286328 A1* | 10/2015 | Lee | G06F 3/0412 345/173 |

FOREIGN PATENT DOCUMENTS

| | | |
|---|---|---|
| WO | WO2007/061057 | 5/2007 |
| WO | WO2011093346 | 8/2011 |

\* cited by examiner

ELECTRONIC DEVICE AND OPERATION INPUT METHOD

RELATED APPLICATION

The present application claims priority to Japanese Patent Application Number 2013-108485, filed May 23, 2013, the entirety of which is hereby incorporated by reference.

BACKGROUND

1. Field of the Invention

The present invention relates to an electronic device that is installed in a vehicle or the like and performs operation input in accordance with a user's actions, and an operation input method.

2. Description of the Related Art

Hitherto, a gesture input apparatus that captures an image of the shape and movement of a hand of the user with a camera, recognizes a gesture, and performs operation input on the basis of the recognized gesture is known (see, for example, Japanese Unexamined Patent Application Publication No. 2009-42796). In this gesture input apparatus, a combination of gesture recognition and touch detection using a touch panel or the like enables complicated operation input. Also, in this gesture input apparatus, function selection buttons to be displayed contain animations of gestures corresponding to respective functions, so that there are advantages that, even when the user is not familiar with operations, the user grasps the gesture that corresponds to a function operation by only viewing the corresponding function selection button and an intended device is able to be operated immediately.

The gesture input apparatus disclosed in Japanese Unexamined Patent Application Publication No. 2009-42796 is convenient because the user views an animation contained in a function selection button and thereby is able to learn the details of a gesture to be made by the user in order to select the function selection button. However, the gesture input apparatus has the following problems.

(1) When the user does not remember the details of a gesture required to select a function selection button, the user views an animation contained in this button. In this case, because the function selection button itself is displayed on part of a display screen and is typically small, it is hard to view the details of the animation and to grasp an operation method (the details of the gesture). In addition, it takes some time to understand the operation method.

(2) Each function selection button typically contains a character and a picture that schematically represent the details of an operation instruction (a function to be performed). However, since the function selection button contains the animation, display of the character and picture is blocked, so that it is hard to grasp the details of the operation instruction selectable via the function selection button.

The present invention has been accomplished in view of such problems, and an object thereof is to provide an electronic device, an operation input method, and an operation input program that enable the user to learn an operation method with ease and in a short time and also to learn the details of an operation instruction with ease.

SUMMARY

In order to solve the above-described problems, an embodiment of the present invention provides an electronic device capable of performing operation input in accordance with a movement of part of a body of a user or a movement of an operation member held by the user. The electronic device includes: an operation screen display unit that displays an operation screen containing an operation key for causing the electronic device to perform a specific action; an operation key moving unit that moves the operation key in a predetermined direction; a movement detection unit that detects a movement of the part of the body of the user or a movement of the operation member held by the user; and an operation selection unit that, when a movement direction of the operation key moved by the operation key moving unit matches a direction of the movement detected by the movement detection unit, selects the operation key moved by the operation key moving unit.

Another embodiment of the present invention provides an operation input method for an electronic device capable of performing operation input in accordance with a movement of part of a body of a user or a movement of an operation member held by the user. The operation input method includes the steps of: displaying, with an operation screen display unit, an operation screen containing an operation key for causing the electronic device to perform a specific action; moving, with an operation key moving unit, the operation key in a predetermined direction; detecting, with a movement detection unit, a movement of the part of the body of the user or a movement of the operation member held by the user; and selecting, with an operation selection unit, when a movement direction of the operation key moved by the operation key moving unit matches a direction of the movement detected by the movement detection unit, the operation key moved by the operation key moving unit.

Another embodiment of the present invention provides an operation input program for an electronic device capable of performing operation input in accordance with a movement of part of a body of a user or a movement of an operation member held by the user. The operation input program causes the electronic device to function as: an operation screen display unit that displays an operation screen containing an operation key for causing the electronic device to perform a specific action; an operation key moving unit that moves the operation key in a predetermined direction; a movement detection unit that detects a movement of the part of the body of the user or a movement of the operation member held by the user; and an operation selection unit that, when a movement direction of the operation key moved by the operation key moving unit matches a direction of the movement detected by the movement detection unit, selects the operation key moved by the operation key moving unit.

A display position of the operation key contained in the operation screen is moved in the predetermined direction, thereby representing a direction (predetermined direction) of an operation required to select this operation key. Thus, the user may learn a required operation method with ease and in a short time. In addition, the details of the operation key to be displayed are not particularly restricted, thereby enabling a character and a picture that represent the details of an operation instruction to be superimposed on the operation key and to be displayed. Hence, the user may easily learn the details of the operation instruction.

In the case where the operation screen displayed by the operation screen display unit contains a plurality of the operation keys, the operation key moving unit preferably moves the plurality of the operation keys in different directions, respectively. This enables the user to use a plurality of operation instructions selectively.

The operation selection unit preferably selects the operation key while the operation key is being moved by the operation key moving unit. This enables a point in time at which an operation is able to be performed and the operation key which is able to be operated at the point to be clarified.

Preferably, the operation screen displayed by the operation screen display unit is newly displayed at a certain point in time in accordance with an interrupt process. Specifically, the electronic device preferably further includes a connection unit that connects a mobile terminal device and the electronic device, and the operation screen is preferably an operation screen for an incoming call that is displayed in accordance with an interrupt process when the incoming call is received on the mobile terminal device. The electronic device preferably further includes a navigation unit that searches for a route to a destination and provides guidance, and the operation screen is preferably a settings screen for a route that is displayed in accordance with an interrupt process when the route is searched for by the navigation unit. This enables the operation screen to be displayed when an operation is required, and may prevent the operation key from moving and reducing visibility in a display screen other than the operation screen.

The operation key moving unit preferably moves an entire image constituting the operation key in the predetermined direction. This enables a large region which is to be moved to be set and the operation key which is to be operated to stand out.

The operation key moving unit preferably moves part of an image constituting the operation key in the predetermined direction. Part of the operation key is moved, so that this movement does not result in blocking of an image arranged around the operation key.

The operation key moving unit preferably moves the operation key repeatedly. The operation key moving unit preferably moves the operation key back and forth. This enables the user to know with certainty that the operation key is moving.

The movement detection unit preferably includes an image capturing unit that captures an image of the part of the body of the user or the operation member held by the user, and an image recognition unit that detects, by using the image captured by the image capturing unit, a movement of the part of the body of the user or a movement of the operation member held by the user. This enables the user to perform operations at a position away from the operation screen and the degree of freedom of operation to be increased so as to improve operability.

The movement detection unit preferably includes a touch panel that is arranged on a display screen of a display device in a superimposed manner and detects a movement of the part of the body of the user or a movement of the operation member held by the user. For this reason, the movement of the user may be easily detected without using an expensive component.

The electronic device preferably further includes a function execution unit that executes a function corresponding to the operation key selected by the operation selection unit. Thus, when the user operates the electronic device, the user may learn a required operation method with ease and in a short time.

DESCRIPTION OF THE PREFERRED EMBODIMENTS

Figure 1:
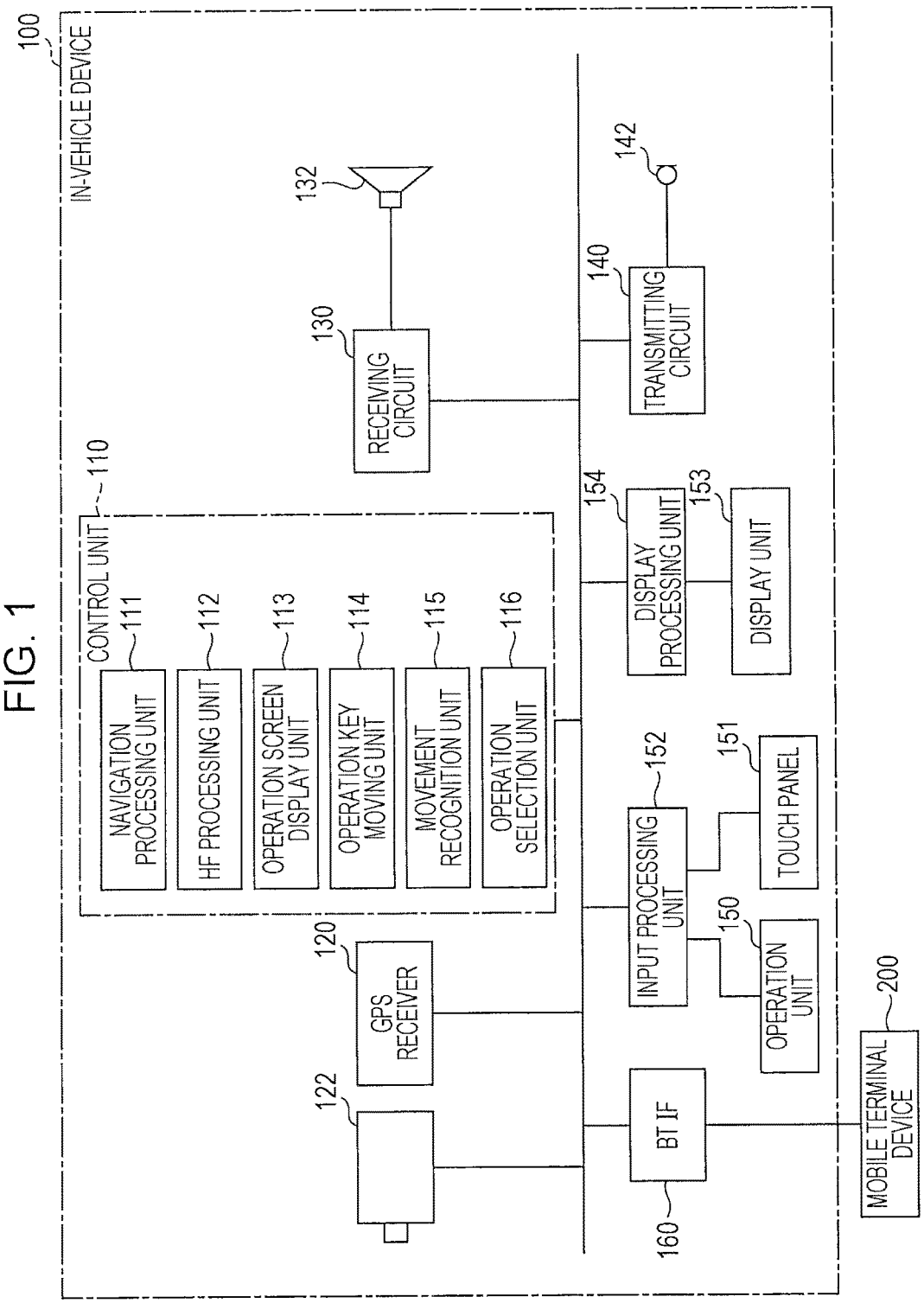
FIG. 1 illustrates the configuration of an in-vehicle device.

An in-vehicle system according to an embodiment of the present invention will be described below with reference to the drawings. FIG. 1 illustrates the configuration of an in-vehicle device 100. The in-vehicle device 100 is an electronic device that serves as a navigation device and a hands-free telephone device. As for at least some operations, an instruction may be provided by using a movement of part of the body of a user or a movement of an operation member held by the user.

The in-vehicle device 100 includes a control unit 110, a global positioning system (GPS) receiver 120, a camera 122, a receiving circuit 130, a speaker 132, a transmitting circuit 140, a microphone 142, an operation unit 150, a touch panel 151, an input processing unit 152, a display unit 153, a display processing unit 154, and a Bluetooth interface unit (BT IF) 160.

The control unit 110 is a unit that controls the entire in-vehicle device 100, and is implemented by the configuration of a computer that executes a certain program stored in a read only memory (ROM), a random access memory (RAM), or the like with a central processing unit (CPU). The GPS receiver 120 receives radio waves from a plurality of GPS satellites and detects a current location of a vehicle (its own vehicle location).

The camera 122 is installed at a certain position in the vehicle (for example, a dashboard, a housing of the in-vehicle device 100, a steering wheel, or the like), and captures an image of a user (a user sitting in a driver seat or a front passenger seat in the vehicle). In the embodiment, it is assumed that the user holds his/her hand up in front of the camera 122 and an image of a movement of the hand is captured. For example, a focal length and a depth of field are set so that a sharp image of the user's hand that is positioned about 20 cm in front of the camera 122 is able to be captured. Detection of a hand movement is an example; alternatively, a movement of part of the body of the user other than the hand (for example, a movement of a face or eyes), or a movement of an operation member (an operation member having a specific shape and a specific pattern) held by the user may be detected.

The receiving circuit 130 outputs, from the speaker 132, a voice signal of a person at the other end of a telephone call (in the embodiment, a voice signal transmitted from a mobile terminal device 200 connected to the in-vehicle device 100). The transmitting circuit 140 performs, via the microphone 142, a process of inputting a voice of the user (for example, a driver of the vehicle) when a conversation with the person at the other end of the telephone call is carried out.

The operation unit 150 includes various keys, switches, operation knobs, and the like that are provided on the housing of the in-vehicle device 100. When part of a screen of the display unit 153 is pointed at by the user, the touch panel 151 detects the position pointed at. The user may provide various operation instructions or various inputs by using the touch panel 151 or the operation unit 150.

The input processing unit 152 monitors the states of the operation of the operation unit 150 and touch panel 151, and detects the details of an operation performed by the user. The display unit 153 may be constituted by a liquid crystal display (LCD) and so forth, and displays various pieces of information. The display processing unit 154 displays, on the display unit 153, an operation screen containing a plurality of operation icons or a screen containing various pieces of information generated by the control unit 110.

The Bluetooth interface unit 160 is a communication device (Bluetooth device) that performs transmission and reception of various pieces of data between the in-vehicle device 100 and the mobile terminal device 200 by using Bluetooth (registered trademark).

The above-described control unit 110 also includes a navigation processing unit 111, a hands-free (HF) processing unit 112, an operation screen display unit 113, an operation key moving unit 114, a movement recognition unit 115, and an operation selection unit 116.

The navigation processing unit 111 performs various navigation actions on the basis of its own vehicle location detected with the GPS receiver 120. For example, a map image of the area around its own vehicle location is drawn, a route search and route guidance in which a driving route to a destination is determined so as to guide the user are made, and a facility search in which a search condition is specified so as to make a search is made. Map data required for these actions may be stored in a hard disk device or a semiconductor memory, which is not illustrated, or alternatively, may be acquired from an external map distribution server via communication.

The HF processing unit 112 performs voice input by using the microphone 142 included in the in-vehicle device 100, and performs a series of hands-free processes in the in-vehicle device 100 in which a conversation is carried out with the person at the other end of the telephone call by using a telephone function of the mobile terminal device 200.

The operation screen display unit 113 displays an operation screen (hereinafter referred to as a "specific operation screen") containing an operation key for causing the in-vehicle device 100 to perform a specific action. For example, in the embodiment, while an incoming call is being received from the outside, the specific operation screen for providing an instruction to answer or disconnect the incoming call is generated and displayed by the operation screen display unit 113. The operation key moving unit 114 moves one or a plurality of operation keys contained in the specific operation screen in a predetermined direction or predetermined directions.

The movement recognition unit 115 detects a movement of the user's hand (specifically, the direction of the movement of the hand) by using an image captured by the camera 122 at certain time intervals. When a movement direction of an operation key moved by the operation key moving unit 114 matches the direction of the movement of the hand detected by the movement recognition unit 115, the operation selection unit 116 selects the operation key moved by the operation key moving unit 114. Specific examples of the specific operation screen and the details of the movement of the operation key will be described later.

Figure 2:
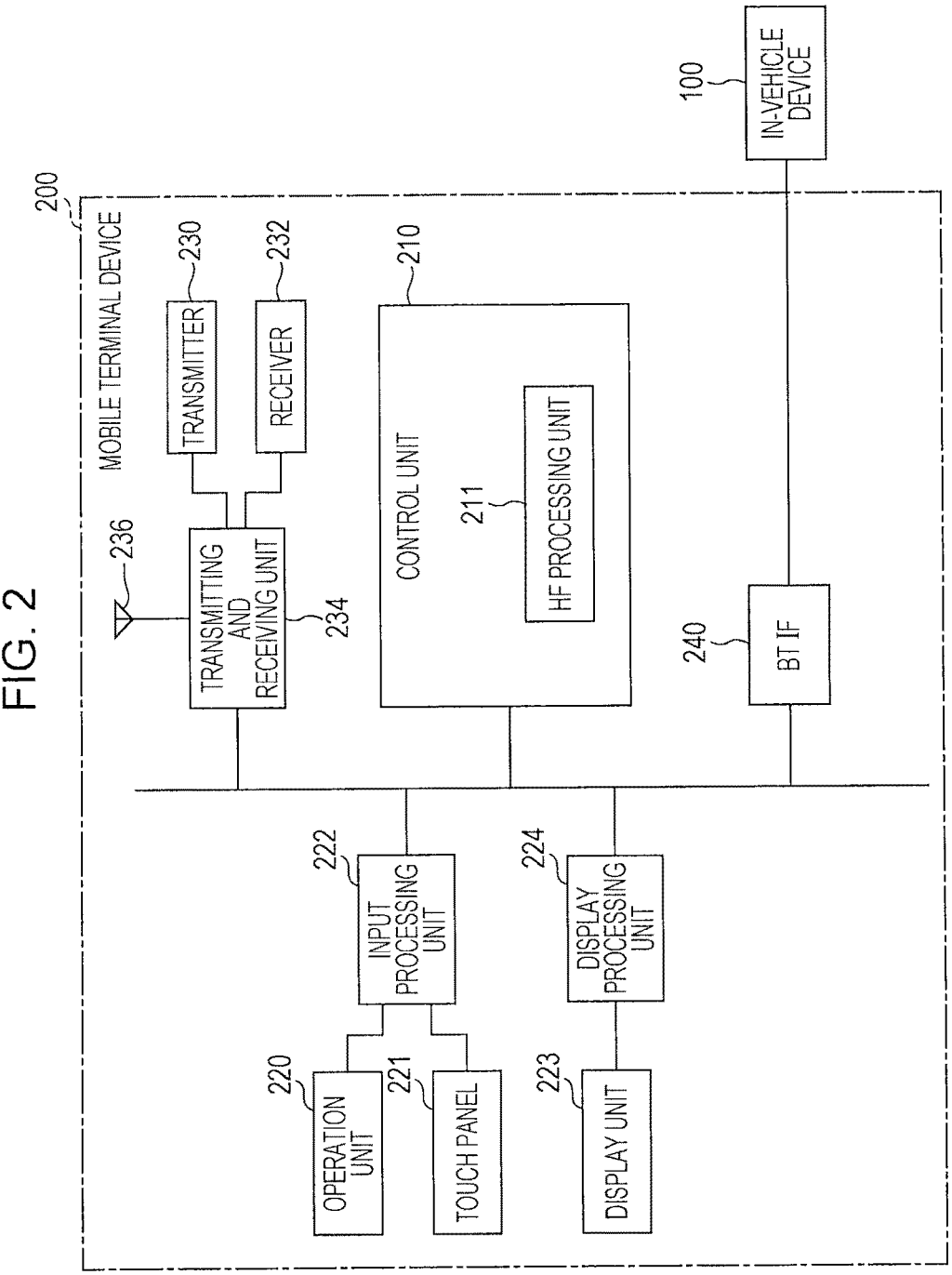
FIG. 2 illustrates the configuration of a mobile terminal device.

FIG. 2 illustrates the configuration of the mobile terminal device 200. The mobile terminal device 200 may serve as a mobile phone and a personal digital assistant, and includes a control unit 210, an operation unit 220, a touch panel 221, an input processing unit 222, a display unit 223, a display processing unit 224, a transmitter 230, a receiver 232, a transmitting and receiving unit 234, and a Bluetooth interface unit (BT IF) 240.

The control unit 210 is a unit that controls the entire mobile terminal device 200, and is implemented by executing a certain program (a basic program, various application programs, or the like) stored in a ROM, RAM, or the like with a CPU. The operation unit 220 includes various switches. When part of a screen of the display unit 223 is pointed at by the user, the touch panel 221 detects the position pointed at. The user may provide various operation instructions or various inputs by using the touch panel 221 or the operation unit 220. The input processing unit 222 monitors the details of the operation of the operation unit 220 and the touch panel 221, and detects the content of an input provided by the user.

The display unit 223 may be constituted by a liquid crystal display (LCD) and so forth, and displays various pieces of information. The display processing unit 224 displays, on the display unit 223, an operation screen containing a plurality of operation icons or a screen containing various pieces of information generated by the control unit 210.

The transmitter 230 inputs a voice of the user (talker). The receiver 232 outputs a voice of the person at the other end of the telephone call. The transmitter 230 is typically constituted by a microphone, and the receiver 232 is typically constituted by an earphone or a speaker. The transmitting and receiving unit 234 acts when a call button (not illustrated), such as the operation unit 220, is pressed. When reception is performed, the transmitting and receiving unit 234 converts a radio signal received via an antenna 236 into a baseband signal, and inputs control data and a voice signal that are contained in the received signal to the control unit 210 and the receiver 232, respectively. In addition, when transmission is performed, the transmitting and receiving unit 234 converts control data input from the control unit 210 and a voice signal input from the transmitter 230 into a radio signal, and transmits the radio signal from the antenna 236 to a base station (not illustrated). In this way, the transmitting and receiving unit 234 performs a call process, an Internet connection process, and so forth by performing transmitting and receiving processes to and from the base station.

The Bluetooth interface unit 240 is a communication device (Bluetooth device) that performs transmission and reception of various pieces of data between the mobile terminal device 200 and the in-vehicle device 100 or other devices by using Bluetooth.

The above-described control unit 210 includes a hands-free (HF) processing unit 211. The HF processing unit 211 performs voice input by using the microphone 142 included in the in-vehicle device 100, and performs a series of hands-free processes in the mobile terminal device 200 in which a conversation is carried out with the person at the other end of the telephone call by using the telephone function of the mobile terminal device 200. The HF processing unit 211 may be implemented by executing a certain application program (HF application).

The operation screen display unit 113 corresponds to an operation screen display unit, the operation key moving unit 114 corresponds to an operation key moving unit, the movement recognition unit 115 and the camera 122 correspond to a movement detection unit, the movement recognition unit 115 corresponds to an image recognition unit, the camera 122 corresponds to an image capturing unit, the operation selection unit 116 corresponds to an operation selection unit, and the navigation processing unit 111 and the HF processing unit 112 correspond to a function execution unit. The Bluetooth interface unit 160 corresponds to a connection unit, and the navigation processing unit 111 and the GPS receiver 120 correspond to a navigation unit.

Figure 3:
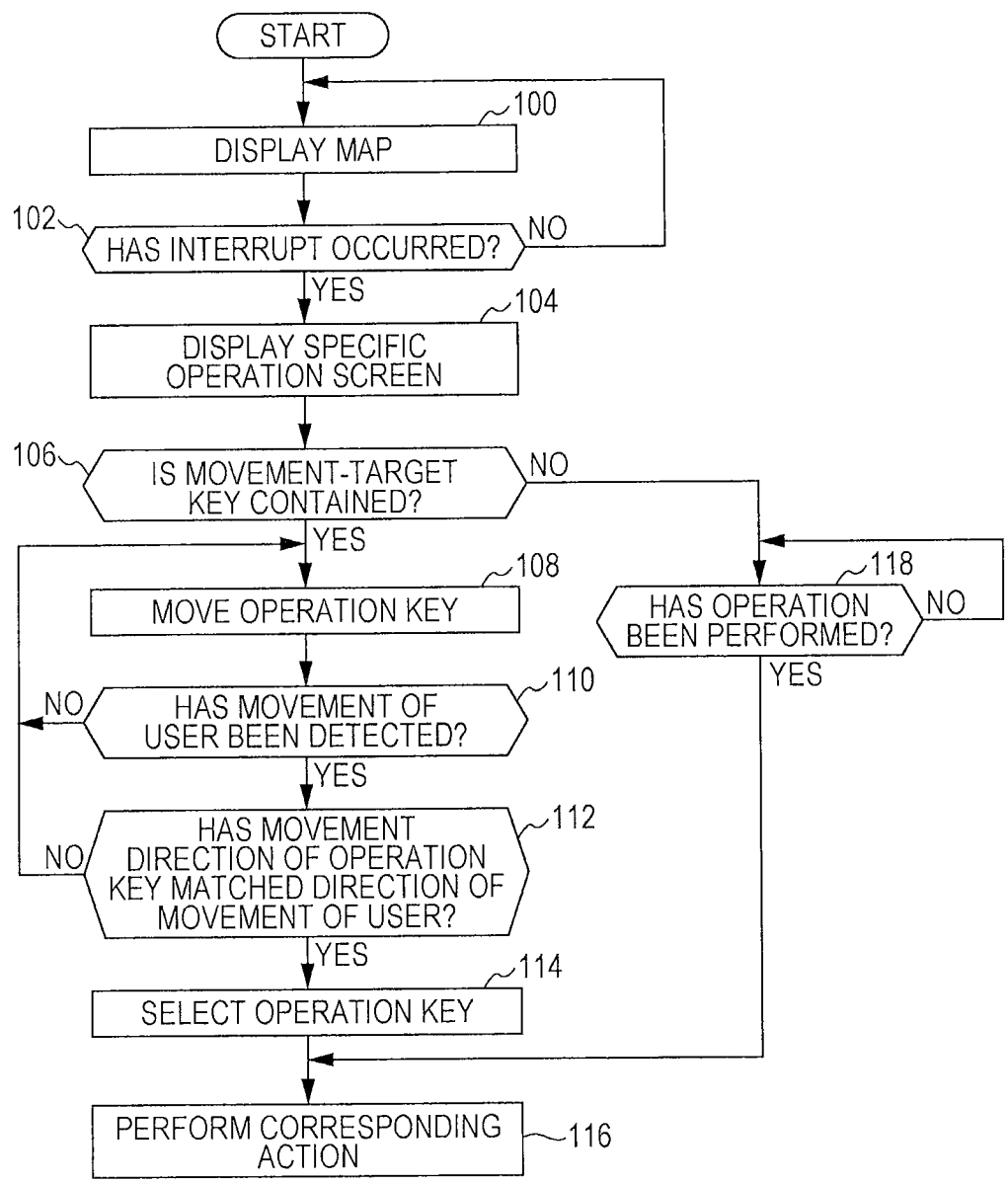
FIG. 3 is a flowchart illustrating process steps performed in the case where an incoming call is received from the outside while a vehicle is being driven and a map image is being displayed.

The in-vehicle device 100 according to the embodiment has such a configuration, and actions performed by the in-vehicle device 100 will be described below. FIG. 3 is a flowchart illustrating process steps performed in the case where an incoming call is received from the outside while the vehicle is being driven and a map image is being displayed.

The navigation processing unit 111 performs an action for displaying a map image (step 100), and at the same time, the operation screen display unit 113 determines whether or not an interrupt has occurred (step 102). When an interrupt does not occur, a determination of NO is made, and the process returns to step 100 so as to continue displaying the map image.

When an incoming call is received on the mobile terminal device 200 from the outside and an interrupt from the HF processing unit 112 occurs, a determination of YES is made in step 102. Subsequently, the operation screen display unit 113 displays a specific operation screen for an incoming call (step 104).

Figure 4:
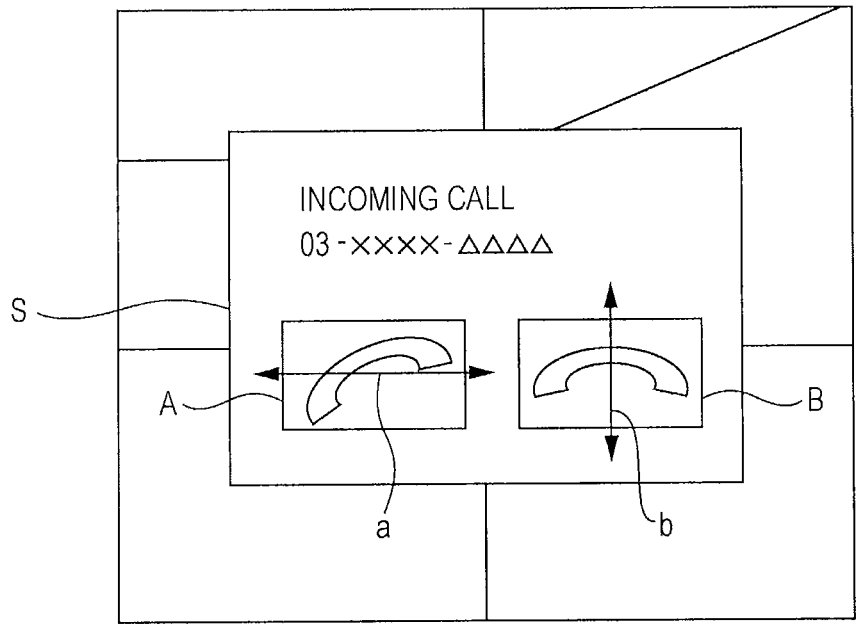
FIG. 4 illustrates an example of a display of a specific operation screen for an incoming call.

FIG. 4 illustrates an example of a display of the specific operation screen for an incoming call. A specific operation screen S is superimposed on the displayed map image and is displayed. The specific operation screen S contains a character string "an incoming call" representing that an incoming call is being received, a telephone number "03-xxxx-ΔΔΔΔ" of a person at the other end of the call, an operation key A for providing an instruction to answer the call, and an operation key B for providing an instruction to disconnect the call.

The operation key moving unit 114 determines whether or not the displayed specific operation screen S contains a movement-target key (step 106). In the example illustrated in FIG. 4, the operation keys A and B are movement-target keys, and thus a determination of YES is made. Subsequently, the operation key moving unit 114 moves the two operation keys A and B serving as the movement-target keys in different directions, respectively (step 108). In the example illustrated in FIG. 4, an arrow a denotes a movement direction of the operation key A, and an arrow b denotes a movement direction of the operation key B. That is, the entire operation key A moves back and forth in a horizontal direction repeatedly. The entire operation key B moves back and forth in a vertical direction repeatedly.

At the same time as such movement actions of the operation keys A and B, the movement recognition unit 115 determines whether or not a movement of the user's hand has been detected (step 110). When a movement of the user's hand has not been detected, a determination of NO is made, and the process returns to step 108 so as to continue the movement actions of the operation keys A and B.

When a movement of the user's hand has been detected, a determination of YES is made in step 110. Subsequently, the operation selection unit 116 determines whether or not the movement directions of the operation keys A and B moved by the operation key moving unit 114 have matched a direction of the movement of the hand detected by the movement recognition unit 115 (step 112). When the movement directions of the operation keys A and B do not match the direction of the movement of the hand, a determination of NO is made, and the process returns to step 108 so as to continue the movement actions of the operation keys A and B.

When either the movement direction of the operation key A or the movement direction of the operation key B matches the direction of the detected movement of the user's hand, a determination of YES is made in step 112. Subsequently, the operation selection unit 116 selects the operation key A or B whose direction matches the direction of the movement (step 114). This selection result is transmitted to the HF processing unit 112 and a corresponding action is performed by the HF processing unit 112 (step 116). For example, when the operation key A is selected, a call process is performed by the HF processing unit 112, and the user may carry out a conversation with the person at the other end of the call. When the operation key B is selected, a line for the call is disconnected by the HF processing unit 112.

When the displayed specific operation screen S does not contain any movement-target key, a determination of NO is made in step 106, and it is determined whether or not an operation has been performed by using the operation unit 150 or the touch panel 151 (step 118). When an operation is performed, an action corresponding to the operation is performed (step 116).

In this way, in the in-vehicle device 100 according to the embodiment, a display position of an operation key contained in the specific operation screen S is moved in a predetermined direction, thereby representing a direction (predetermined direction) of an operation required to select this operation key. Thus, the user may learn a required operation method with ease and in a short time. In addition, the details of the operation key to be displayed are not particularly restricted, therefore enabling a character and a picture that represent the details of an operation instruction to be superimposed on the operation key and to be displayed. Hence, the user may easily learn the details of the operation instruction.

In the case where the displayed specific operation screen S contains a plurality of operation keys, the operation key moving unit 114 moves the plurality of operation keys in different directions, respectively, therefore enabling the user to use a plurality of operation instructions selectively.

The operation key is selected while the operation key is moving, thereby enabling a point in time at which an operation is able to be performed and the operation key which is able to be operated at the point to be clarified.

The specific operation screen S is displayed at a certain point in time in accordance with an interrupt process. This enables the specific operation screen S to be displayed when an operation is required, and may prevent the operation key from moving and reducing visibility in a display screen other than the specific operation screen S.

An entire image constituting the operation key is moved in the predetermined direction, thereby enabling a large region which is to be moved to be set and the operation key which is to be operated to stand out. The operation key is moved back and forth repeatedly, thereby enabling the user to know with certainty that the operation key is moving.

A movement of the user is detected by using the camera 122, therefore enabling the user to perform operations at a position away from the specific operation screen S and the degree of freedom of operation to be increased so as to improve operability.

Figure 5:
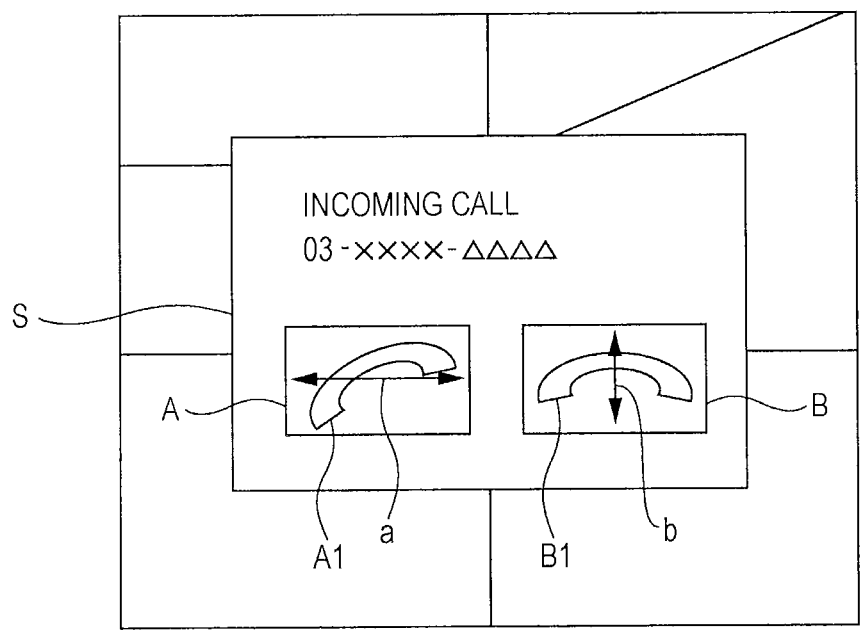
FIG. 5 illustrates a modification of an operation screen.

The present invention is not limited to the above-described embodiment, and various modifications may be made within the scope of the present invention. For example, in the above-described embodiment, as illustrated in FIG. 4, the entire operation keys A and B contained in the specific operation screen S are respectively moved in horizontal and vertical directions; alternatively, parts of images constituting the operation keys A and B may be moved in predetermined directions, respectively. For example, as illustrated in FIG. 5, only an operation key mark A1 contained in the operation key A may be moved back and forth in the horizontal direction repeatedly, and only an operation key mark B1 contained in the operation key B may be moved back and forth in the vertical direction repeatedly. Part of the operation key is moved, so that this movement does not result in blocking of an image arranged around the operation key.

As a movement direction, not only a horizontal or vertical direction but also any direction may be used. For example, the operation key may be moved in an oblique direction, or may be moved in a circle in a given direction. The operation keys A and B contained in the specific operation screen S are moved back and forth in the predetermined directions repeatedly or, alternatively, may be moved back and forth in the predetermined directions only once.

In the above-described embodiment, a movement of the user is detected by using the camera 122; alternatively, another detection method may be used. For example, a direction of a movement of a fingertip of the user may be detected by using the touch panel 151. For this reason, the movement of the user may be easily detected without using an expensive component.

In the above-described embodiment, the case where the specific operation screen S contains the two operation keys A and B as movement-target keys has been described; however, the number of operation keys serving as movement-target keys may be one, or three or more. Note that it is hard to view the contents of an operation screen when a large number of operation keys are respectively moved in different directions. Thus, in the case where a certain number or more of (for example, four or more) operation keys are contained, it is desirable to perform operations by using the operation unit 150 or the touch panel 151 without moving the operation keys.

In the above-described embodiment, the case where an incoming call is received and an interrupt occurs while a map image is being displayed has been described; however, the present invention may also be applied to the case where an interrupt required for a process other than a telephone call occurs. For example, the case is considered where, while a route guidance to a destination is being provided, a detour route different from a current road on which a vehicle is being driven is found and then an interrupt for suggesting changing a route to the detour route occurs. An interrupt does not have to be an interrupt that occurs while a navigation action, such as map display, is being performed. Thus, the present invention may also be applied to the case where an interrupt occurs while another action is being performed. The specific operation screen S that is displayed when an interrupt occurs has been described; however, an operation screen that is displayed at all times, or an operation screen that is displayed in accordance with an operation performed by the user may contain an operation key serving as a movement-target key.

As described above, according to the present invention, a display position of an operation key contained in an operation screen is moved in a predetermined direction, thereby representing a direction (predetermined direction) of an operation required to select this operation key. Thus, the user may learn a required operation method with ease and in a short time.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An electronic device capable of performing operation input in accordance with a movement of part of a body of a user, the electronic device comprising:
    an operation screen display unit that displays an operation screen containing multiple operation keys, wherein selection of each operation key causes the electronic device to perform a specific action;
    an operation key moving unit that moves the multiple operation keys on the operation screen in multiple different predetermined displacement directions independent of movement of the part of the body of the user, the multiple different predetermined displacement directions representing directions of operations required to select one of the operation keys;
    a movement detection unit that detects a direction of movement of the part of the body of the user; and
    an operation selection unit that, when a movement direction of one of the operation keys moved by the operation key moving unit matches a direction of the movement detected by the movement detection unit, selects that operation key moved by the operation key moving unit;
    wherein the movement detection unit includes an image capturing unit that captures an image of the part of the body of the user, and an image recognition unit that detects, by using the image captured by the image capturing unit, a movement of the part of the body of the user.

2. The electronic device according to claim 1,
    wherein, in a case where the operation screen displayed by the operation screen display unit contains a plurality of operation keys, the operation key moving unit moves the operation keys in different directions, respectively.

3. The electronic device according to claim 1,
    wherein the operation selection unit selects the operation key while the operation key is being moved by the operation key moving unit.

4. The electronic device according to claim 1,
    wherein the operation screen displayed by the operation screen display unit is newly displayed at a certain point in time in accordance with an interrupt process.

5. The electronic device according to claim 4, further comprising
    a connection unit that connects a mobile terminal device and the electronic device,
    wherein the operation screen is an operation screen for an incoming call that is displayed in accordance with an interrupt process when the incoming call is received on the mobile terminal device.

6. The electronic device according to claim 4, further comprising
    a navigation unit that searches for a route to a destination and provides guidance, wherein the operation screen is a settings screen for a route that is displayed in accordance with an interrupt process when the route is searched for by the navigation unit.

7. The electronic device according to claim 1,
wherein the operation key moving unit moves an entire image constituting the operation key in the predetermined direction.

8. The electronic device according to claim 1,
wherein the operation key moving unit moves part of an image constituting the operation key in the predetermined direction.

9. The electronic device according to claim 1,
wherein the operation key moving unit moves the operation key repeatedly.

10. The electronic device according to claim 1,
wherein the operation key moving unit moves the operation key back and forth.

11. The electronic device according to claim 1,
wherein the movement detection unit includes a touch panel that is arranged on a display screen of a display device in a superimposed manner and detects a movement of the part of the body of the user.

12. The electronic device according to claim 1, further comprising
a function execution unit that executes a function corresponding to the operation key selected by the operation selection unit.

13. An operation input method for an electronic device capable of performing operation input in accordance with a movement of part of a body of a user, the operation input method comprising the steps of:
displaying, with an operation screen display unit, an operation screen containing multiple operation keys, wherein selection of each operation key causes the electronic device to perform a specific action;
moving, with an operation key moving unit, the multiple operation keys on the operation screen in multiple different predetermined displacement directions independent of movement of the part of the body of the user, the multiple different predetermined displacement directions representing directions of operations required to select one of the operation keys;
capturing, with an image capturing unit, an image of the part of the body of the user;
detecting, with a movement detection unit, by using the captured image, a direction of movement of the part of the body of the user; and
selecting, with an operation selection unit, when a movement direction of one of the operation keys moved by the operation key moving unit matches a direction of the movement detected by the movement detection unit, that operation key moved by the operation key moving unit.

14. The operation input method according to claim 13, further comprising
in a case where the operation screen displayed by the operation screen display unit contains a plurality of operation keys, moving the operation keys in different directions, respectively.

15. The operation input method according to claim 13, further comprising
selecting the operation key while the operation key is being moved.

16. The operation input method according to claim 13, further comprising
newly displaying the operation screen displayed by the operation screen display unit at a certain point in time in accordance with an interrupt process.

17. The operation input method according to claim 13,
wherein the movement detection unit includes a touch panel that is arranged on a display screen of a display device in a superimposed manner and detects a movement of the part of the body of the user.

18. The operation input method according to claim 13, further comprising
executing a function corresponding to the selected operation key.

* * * * *